US011006577B2

(12) United States Patent
Jelenkovic

(10) Patent No.: US 11,006,577 B2
(45) Date of Patent: May 18, 2021

(54) SYSTEM AND METHOD FOR ADJUSTING OPERATING PARAMETERS OF AN AGRICULTURAL HARVESTER BASED ON ESTIMATED CROP VOLUME

(71) Applicant: CNH Industrial America, LLC, New Holland, PA (US)

(72) Inventor: Bojan Jelenkovic, Joliet, IL (US)

(73) Assignee: CNH Industrial America LLC, New Holland, PA (US)

( * ) Notice: Subject to any disclaimer, the term of this patent is extended or adjusted under 35 U.S.C. 154(b) by 260 days.

(21) Appl. No.: 15/904,544

(22) Filed: Feb. 26, 2018

(65) Prior Publication Data

US 2019/0261560 A1 Aug. 29, 2019

(51) Int. Cl.
*A01D 41/127* (2006.01)
*A01D 75/00* (2006.01)
*B60R 1/00* (2006.01)
*G06T 7/00* (2017.01)
*H04N 5/247* (2006.01)
*H04N 5/33* (2006.01)

(52) U.S. Cl.
CPC ....... *A01D 41/127* (2013.01); *A01D 41/1274* (2013.01); *A01D 75/00* (2013.01); *B60R 1/00* (2013.01); *G06T 7/0004* (2013.01); *H04N 5/247* (2013.01); *H04N 5/332* (2013.01); *B60R 2300/108* (2013.01); *B60R 2300/80* (2013.01); *G06T 2207/10024* (2013.01); *G06T 2207/10048* (2013.01); *G06T 2207/30188* (2013.01)

(58) Field of Classification Search
CPC .. A01D 41/127; A01D 75/00; A01D 41/1274; G06T 2207/30188; G06T 2207/10048; G06T 2207/10024; G06T 7/0004; B60R 2300/80; B60R 2300/108; B60R 1/00; H04N 5/332; H04N 5/247
See application file for complete search history.

(56) References Cited

U.S. PATENT DOCUMENTS 8,855,937 B2 10/2014 Lindores
10,371,561 B2* 8/2019 Darr ................... G01F 25/0084
(Continued)

FOREIGN PATENT DOCUMENTS

WO WO 2016/154482 9/2016
WO WO 2017/004074 1/2017

*Primary Examiner* — Hunter B Lonsberry
*Assistant Examiner* — Mathew Franklin Gordon
(74) *Attorney, Agent, or Firm* — Rickard K. DeMille; Rebecca L. Henkel

(57) ABSTRACT

In one aspect, a system for adjusting operating parameters of an agricultural harvester based on estimated crop volume values may include an image capture device configured to capture one or more images of the crop materials standing within the field prior to the crop materials being harvested by a harvester. The system may also include a controller communicatively coupled to the image capture device. The controller may be configured to estimate a crop volume value associated with a quantity of the crop materials transferred through the harvester based on the one or more images captured by the image capture device. Additionally, the controller may be further configured to initiate a control action associated with adjusting an operating parameter of the harvester based on a magnitude of the estimated crop volume value.

19 Claims, 5 Drawing Sheets

(56) References Cited

U.S. PATENT DOCUMENTS

| | | | |
|---|---|---|---|
| 2009/0037059 A1* | 2/2009 | Huster | A01B 69/001 |
| | | | 701/50 |
| 2012/0029732 A1* | 2/2012 | Meyer | A01D 43/085 |
| | | | 701/2 |
| 2015/0379721 A1 | 12/2015 | Good et al. | |
| 2016/0086032 A1 | 3/2016 | Pickett | |
| 2017/0034986 A1 | 2/2017 | Kock et al. | |
| 2018/0047177 A1* | 2/2018 | Obropta | G06T 7/55 |
| 2019/0021226 A1* | 1/2019 | Dima | A01D 41/141 |

\* cited by examiner

SYSTEM AND METHOD FOR ADJUSTING OPERATING PARAMETERS OF AN AGRICULTURAL HARVESTER BASED ON ESTIMATED CROP VOLUME

FIELD

The present disclosure generally relates to agricultural harvesters and, more particularly, to systems and methods for adjusting the operating parameters of an agricultural harvester based on an estimated volume value of crop materials being transferred through the harvester.

BACKGROUND

An agricultural harvester is a machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop materials from the field. The harvester also includes a crop processing system, which performs various processing operations (e.g., threshing, separating, cleaning, etc.) on the harvested crop materials received from the harvesting implement. Furthermore, the harvester includes a crop tank, which receives and stores the harvested crop materials after processing.

In general, the volume of crop materials processed by a harvester is detected by a yield sensor positioned in or proximate to the crop tank. However, there is a significant time delay (e.g., about 15 seconds) between when the harvesting implement initially contacts crop materials within the field and when such crop materials are detected by the yield sensor at the crop tank. As such, conventional sensing systems are unable to provide real-time estimates of the current volumetric throughput at one or more locations within the harvester upstream of the crop tank, thereby substantially limiting the ability to actively adjust one or more operating parameters of the harvester at such upstream locations based on variations in the volumetric throughput.

Accordingly, an improved system and method for adjusting one or more operating parameters of an agricultural harvester based on the estimated crop volume being transferred through the harvester at any given time would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for adjusting operating parameters of an agricultural harvester based on estimated crop volume values. The system may include an agricultural harvester having a harvesting implement configured to intake crop materials from a field and a crop processing system configured to process the crop materials received from the harvesting implement. The system may also include an image capture device configured to capture one or more images of the crop materials standing within the field prior to the crop materials being harvested by the harvester. Furthermore, the system may include a controller communicatively coupled to the image capture device. The controller may be configured to estimate a crop volume value associated with a quantity of the crop materials transferred through the harvester based on the one or more images captured by the image capture device. Additionally, the controller may be further configured to initiate a control action associated with adjusting an operating parameter of the harvester based on a magnitude of the estimated crop volume value.

In another aspect, the present subject matter is directed to a method for adjusting operating parameters of an agricultural harvester based on estimated crop volume values. The agricultural harvester including a harvesting implement configured to intake crop materials from a field and a crop processing system configured to process the crop materials received from the harvesting implement. The method may include receiving, with a computing device, one or more images of a quantity of crop materials standing within the field prior to the crop materials being harvested by the harvester. The method may also include estimating, with the computing device, a crop volume value associated with a quantity of crop materials to be transferred through the harvester based on the one or more images. Furthermore, the method may include initiating, with the computing device, a control action associated with adjusting an operating parameter of the harvester based on a magnitude of the estimated crop volume value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
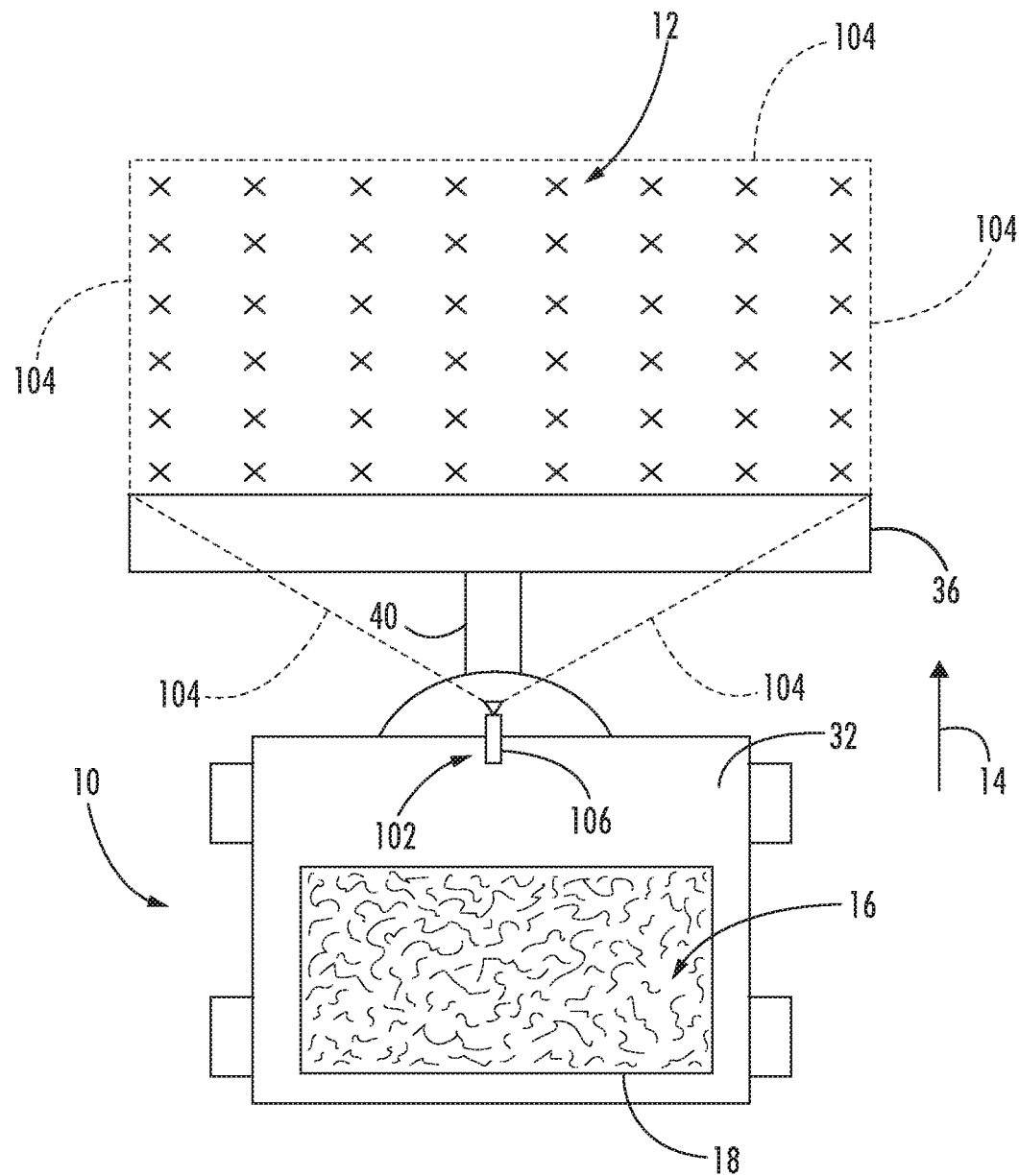
FIG. 1 illustrates a top view of one embodiment of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting one or more operating parameters of an agricultural harvester based on estimated crop volume values. Specifically, in several embodiments, a controller of the disclosed system may be configured to receive one or more images of a quantity of crop materials standing within a field in front of the harvester prior to the crop materials being harvested. For example, in one embodiment, the one or more received images may be indicative of amounts of various wavelengths of light (e.g., red light and/or near-infrared light) reflected by the crop materials, with the amounts of reflected light generally being indicative of a volume of crop materials. As such, the controller may be configured to estimate the volume of crop materials to be harvested and subsequently transferred through the harvester based on the received images. Thereafter, the controller may further be configured to initiate a control action associated with adjusting an operating parameter of the harvester based on the estimated volume of crop materials to be harvested and transferred through the harvester so as to accommodate such volume of crop materials within the harvester. For instance, the controller may be configured to adjust the speed(s) of various augers, conveyors, and/or rotors within the harvester to allow the harvester to harvest and process (e.g., thresh, separate, etc.) the estimated volume of crop materials.

Figure 2:
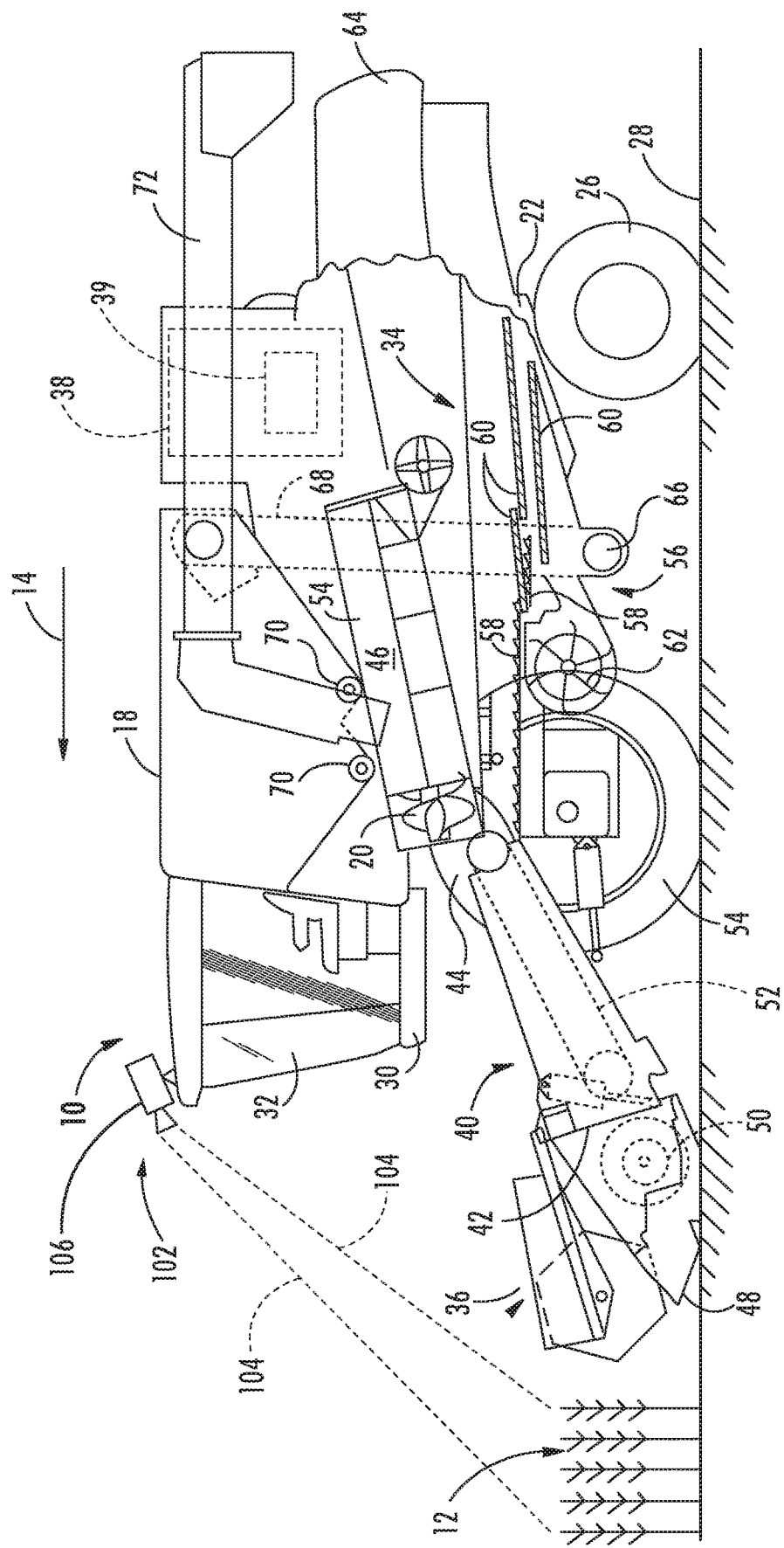
FIG. 2 illustrates a side view of the agricultural harvester shown in FIG. 1, particularly illustrating the harvester including a harvesting implement and a crop processing system.

Referring now to the drawings, FIGS. 1 and 2 illustrate differing views of one embodiment of an agricultural harvester 10 in accordance with aspects of the present disclosure. Specifically, FIG. 1 illustrates a top view of the harvester 10 while the harvester 10 is being used to harvest a quantity of standing crop 12 from a field. Additionally, FIG. 2 illustrates a partial sectional side view of the harvester 10, particularly illustrating various components of the harvester 10.

In general, the harvester 10 may be configured to be moved across a field in a direction of travel (e.g., as indicated by arrow 14) to harvest the standing crop 12. While traversing the field, the harvester 10 may be configured to intake and process harvested crop materials 16 and store the harvested crop materials 16 within a crop tank 18 of the harvester 10. Furthermore, the harvester 10 may be configured to unload the harvested crop materials 16 stored within the crop tank 18 into a crop cart (not shown) or other suitable crop container.

Referring specifically to FIG. 2, in one embodiment, the harvester 10 may be configured as an axial-flow type combine, wherein the harvested crop materials 16 are threshed and separated while being advanced by and along a longitudinally arranged rotor 20. However, it should be appreciated that, in alternative embodiments, the harvester 10 may have any suitable harvester configuration.

As shown in FIG. 2, the harvester 10 may include a chassis or main frame 22 configured to support and/or couple to various components of the harvester 10. For example, in several embodiments, the harvester 10 may include a pair of driven, ground-engaging front wheels 24 and a pair of steerable rear wheels 26 that are coupled to the frame 22. As such, the wheels 24, 26 may be configured to support the harvester 10 relative to a ground surface 28 and move the harvester 10 in the forward direction of travel 14 relative to the ground surface 28. Furthermore, the harvester 10 may include an operator's platform 30 having an operator's cab 32, a crop processing system 34, and the crop tank 18 that are supported by the frame 22. As will be described below, the crop processing system 34 may be configured to perform various processing operations on the harvested crop 16 as the crop processing system 34 operates to transfer the harvested crop 16 between a harvesting implement (e.g., header 36) of the harvester 10 and the crop tank 18. Additionally, as is generally understood, the harvester 10 may include an engine 38 and a transmission 39 mounted on the frame 22. The transmission 39 may be operably coupled to the engine 38 and may provide variably adjusted gear ratios for transferring engine power to the wheels 24, 26 via a drive axle assembly (or via axles if multiple drive axles are employed).

Moreover, as shown in FIG. 2, the header 36 and an associated feeder 40 of the crop processing system 34 may extend forward of the frame 22 and may be pivotally secured thereto for generally vertical movement. In general, the feeder 40 may be configured to serve as support structure for the header 36. As shown in FIG. 2, the feeder 40 may extend between a front end 42 coupled to the header 36 and a rear end 44 positioned adjacent to a threshing and separating assembly 46 of the crop processing system 34. As is generally understood, the rear end 44 of the feeder 40 may be pivotally coupled to a portion of the harvester 10 to allow the front end 42 of the feeder 40 and, thus, the header 36 to be moved upward and downward relative to the ground 28 to set the desired harvesting or cutting height for the header 36.

As the harvester 10 is propelled forwardly over the field with the standing crop 12, the crop materials 16 are severed from the stubble by a sickle bar 48 at the front of the header 36 and delivered by a header auger 50 to the front end 42 of the feeder 40. A feeder conveyor 52 transports the harvested crop materials 16 from the front end 42 of the feeder 40 to the threshing and separating assembly 46. As is generally understood, the threshing and separating assembly 46 may include a cylindrical chamber 54 in which the rotor 20 is rotated to thresh and separate the harvested crop materials 16 received therein. That is, the harvested crop materials 16 are rubbed and beaten between the rotor 20 and the inner surfaces of the chamber 54, whereby the grain, seed, or the like, is loosened and separated from the straw.

The harvested crop materials 16 that have been separated by the threshing and separating assembly 46 may fall onto a crop cleaning assembly 56 of the crop processing system 34. In general, the crop cleaning assembly 56 may include a series of pans 58 and associated sieves 60. As is generally understood, the separated harvested crop materials 16 may be spread out via oscillation of the pans 58 and/or the sieves 60 and may eventually fall through apertures defined in the sieves 60. Additionally, a cleaning fan 62 may be positioned adjacent to one or more of the sieves 60 to provide an air flow through the sieves 60 that removes chaff and other impurities from the harvested crop materials 16. For instance, the fan 62 may blow the impurities off of the harvested crop materials 16 for discharge from the harvester 10 through the outlet of a straw hood 64 positioned at the back end of the harvester 10. The cleaned harvested crop materials 16 passing through the sieves 60 may then fall into a trough of an auger 66, which may be configured to transfer the harvested crop materials 16 to an elevator 68 for delivery to the crop tank 18. Additionally, in one embodiment, a pair of tank augers 70 at the bottom of the crop tank 18 may be used to urge the cleaned harvested crop materials 16 sideways to an unloading tube 72 for discharge from the harvester 10.

It should be appreciated that the configuration of the harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
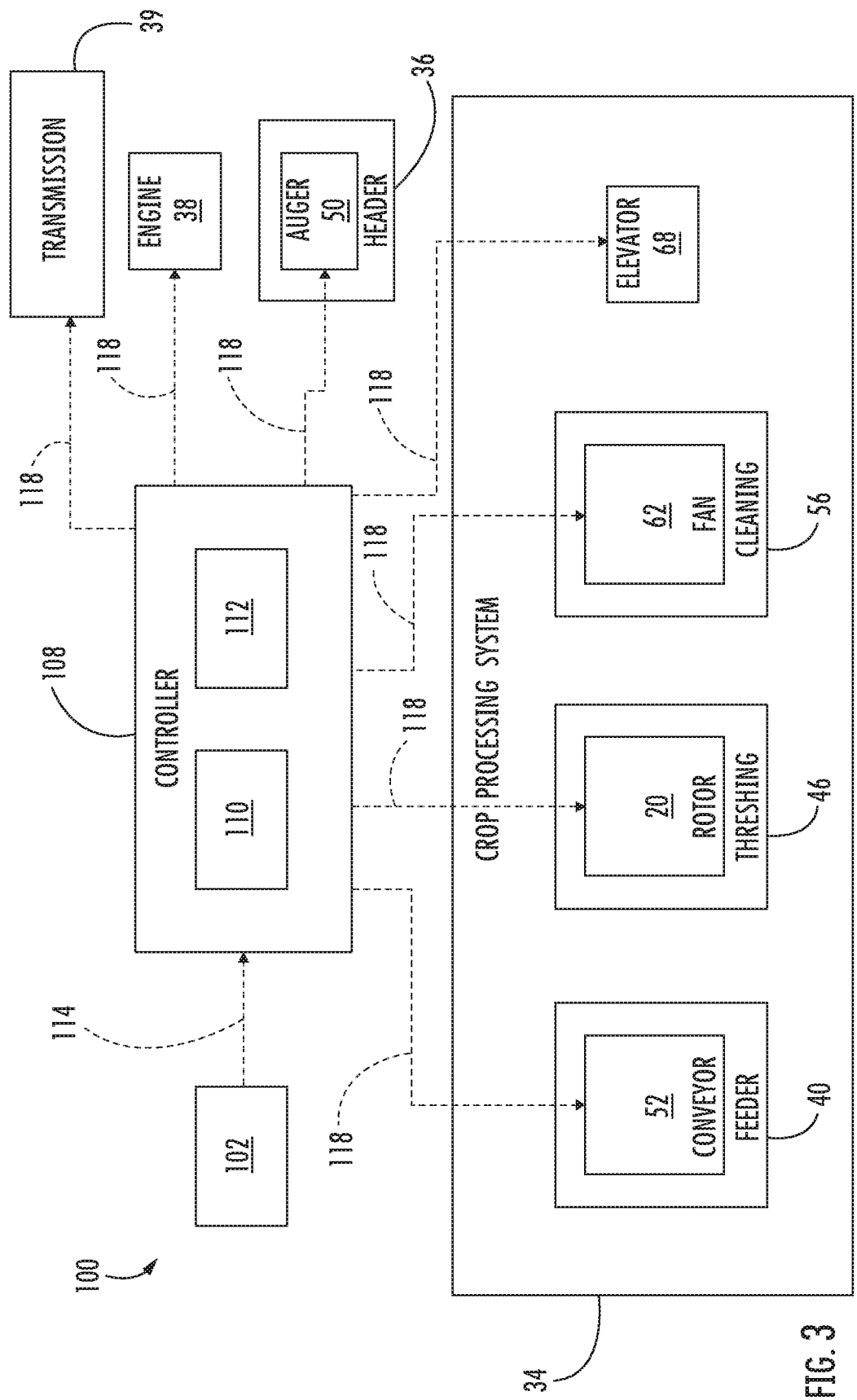
FIG. 3 illustrates a schematic view of one embodiment of a system for adjusting operating parameters of an agricultural harvester based on estimated crop volume values in accordance with aspects of the present subject matter.

Referring now to FIG. 3, a schematic view of one embodiment of a system 100 for adjusting operating parameters of an agricultural harvester based on estimated crop volume values is illustrated in accordance with aspects of the present subject matter. In general, the system 100 will be described herein with reference to the harvester 10 described above with reference to FIGS. 1 and 2. However, it should be appreciated by those of ordinary skill in the art that the disclosed system 100 may generally be utilized with harvesters having any other suitable harvester configuration.

As shown in FIG. 3, the system 100 may include various components of the harvester 10. As such, in several embodiments, the system 100 may include one or more components of the crop processing system 34, such as one or more components of the feeder 40, the threshing and separating assembly 46, and/or the crop cleaning assembly 56. For example, in the embodiment shown in FIG. 3, the system 100 may include the feeder conveyor 52 of the feeder 40, the rotor 20 of the threshing and separating assembly 46, the fan 62 of the crop cleaning assembly 56, and the elevator 68. Furthermore, the system 100 may include one or more components of the header 36, such as the header auger 50. Additionally, the system 100 may include the engine 38 of the harvester 10. However, it should be appreciated that, in alternative embodiments, the system 100 may include any other suitable components of the harvester 10.

Moreover, the system 100 may include an image capture device 102 configured to capture one or more images of the standing crop 12 within the field immediately prior to the crop 12 being harvested by the harvester 10. Specifically, in several embodiments, the image capture device 102 may be configured to capture one or more images of a quantity of the standing crop 12 positioned immediately in front of the header 36 of the harvester 10 relative to the direction of travel 14. As will be described below, the images captured by the image capture device 102 may then be used to estimate a volume of the crop materials 16 that will be ingested by the harvester 10 when the quantity of the standing crop 12 shown in the images is subsequently harvested by the harvester 10. In one embodiment, the image capture device 102 may be configured to continuously capture images of the standing crop 12 positioned immediately in front of the header 36 as the harvester 10 is moved through the field.

Referring back to FIGS. 1 and 2, in one embodiment, the image capture device 102 may be installed or otherwise positioned on the harvester 10. Specifically, in several embodiments, the image capture device 102 may be positioned on the harvester 10 such that the image capture device 102 has a field of view (e.g., as indicated by dashed lines 104 in FIG. 1) directed toward a location immediately in front of the header 36. As such, the standing crop 12 positioned within the field of view of the image capture device 102 may correspond to the quantity of the standing crop 12 positioned immediately in front of the header 36. For example, as shown, in one embodiment, the image capture device 102 may be coupled to a top end of the operator's cab 32. As such, the image capture device 102 may be able to capture images of the quantity of the standing crop 12 in front of the header 36 relative to the direction of travel 14. However, it should be appreciated that, in alternative embodiments, the image capture device 102 may be positioned and/or coupled to the any other suitable component of or location on the harvester 10, such as on a portion of the header 36 or on the exterior of the crop tank 18 or the unloading tube 72. Furthermore, the image capture device 102 may be mounted on a separate vehicle (not shown) associated with the harvester 10, such as crop cart, tractor or other work vehicle, or unmanned aerial vehicle (UAV).

It should be appreciated that, in one embodiment, the standing crop 12 may be positioned immediately in front of the header 36 when such crop 12 is positioned within fifty feet in front of the header 36, such as within forty feet in front of the header 36, within thirty feet in front of the header 36, within twenty feet in front of the header 36, and/or within ten feet in front of the header 36. In a further embodiment, the standing crop 12 may be positioned immediately in front of the header 36 when the header 36 will encounter such crop 12 within five seconds of continued travel of the harvester 10, such as within four seconds, within three seconds, within two seconds, and/or within one second. In alternative embodiments, however, the standing crop 12 immediately in front of the header 36 may be any other suitable distance in front the header 36.

In several embodiments, the image capture device 102 may correspond to a color infrared (CIR) camera 106. As is generally understood, CIR cameras 106 may be configured to detect red light (e.g., light generally having a frequency between 630 and 700 nanometers) and near-infrared (NIR) light (e.g., light generally having a frequency between 700 and 1000 nanometers) reflected by the standing crop 12 and generate one or more images indicative of the amounts of the red and NIR light reflected by the standing crop 12. As will be described in greater below, the amounts of the red and NIR light reflected by the standing crop 12 may be indicative of or otherwise associated with a volume of the crop materials 16 that will be transferred through the harvester 10 when the standing crop 12 in the images is harvested by the harvester 10. However, a person of ordinary skill in the art would appreciate that the image capture device 102 may correspond to any other suitable type of image capture device.

Referring back to FIG. 3, in accordance with aspects of the present subject matter, the system 100 may also include a controller 108 configured to electronically control the operation of one or more components of the harvester 10. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 112 may generally be configured to store suitable computer-readable instructions that, when implemented by the processor(s) 110, configure the controller 108 to perform various computer-implemented functions, such as one or more aspects of the method 200 described below with reference to FIG. 5. In addition, the controller 108 may also include various other suitable components, such as a communications circuit or module, one or more input/output channels, a data/control bus and/or the like.

It should be appreciated that the controller 108 may correspond to an existing controller of the harvester 10 or the controller 108 may correspond to a separate processing device. For instance, in one embodiment, the controller 108 may form all or part of a separate plug-in module that may be installed within the harvester 10 to allow for the disclosed system and method to be implemented without requiring additional software to be uploaded onto existing control devices of the harvester 10.

In several embodiments, the controller 108 may be configured to receive one or more images of a quantity of the standing crop 12 within a field prior to the standing crop 12 being harvested by the harvester 10. Specifically, as shown in FIG. 3, the controller 108 may be communicatively coupled to the image capture device 102 via a wired or wireless connection to allow image data (e.g., indicated by dashed line 114 in FIG. 3) to be transmitted from the image capture device 102 to the controller 108. For example, in one embodiment, the controller 108 may be configured to continuously receive images via the image data 114 corresponds to the images captured by the image capture device 102 as the harvester 10 is moved through the field.

The controller 108 may also be configured to estimate a crop volume value associated with a quantity of the harvested crop materials 16 to be transferred through the harvester 10 based on the one or more images received from the image capture device 102. In general, the crop volume value may be an estimate of the volume or amount of the crop materials 16, including both grain and materials other than grain (MOG), that will be ingested and transferred through the harvester 10 when the quantity of the standing crop 12 shown in the captured images is harvested by the harvester 10. Specifically, in several embodiments, the estimated crop volume value may correspond to an instantaneous crop volume value of the standing crop 12 to be harvested by the harvester 10. In such embodiments, the instantaneous crop volume value may be estimated based on images captured by the image capture device 102 of the standing crop 12 within field immediately in front of the header 36. Additionally, as is generally understood, the volume or amount of crop materials 16 produced by the standing crop 12 may vary as the harvester 10 is moved through the field. As such, in one embodiment, the controller 108 may be configured to continuously update the estimated crop volume value based on subsequent images of the standing crop 12 in front of the header 36 based on images continuously received from the image capture device 102 as the harvester 10 is moved through the field.

As mentioned above, the image capture device 102 may, in several embodiments, correspond to the CIR camera 106, and, thus, may be configured to generate images indicative of the amounts of red and/or NIR light reflected by the standing crop 12. In such embodiments, the controller 108 may be configured to estimate the crop volume value based on the relative amounts the red and/or NIR light present in the images captured by the CIR camera 106. In general, healthy crops (e.g., crops that produce large volumes of crop materials) reflect large amounts of NIR light and small amounts of red light, while unhealthy crops (e.g., crops that produce small volumes of crop materials) reflect large amounts of red light and small amounts of NIR light. In this regard, the amounts of red and/or NIR light reflected by a quantity of the standing crop 12 may be indicative of the volume of the crop materials 16 to be ingested by the harvester 10 when that quantity of the standing crop 12 is harvested by the harvester 10. As such, the controller 108 may include a look-up table or suitable mathematical formula stored within its memory 112 that correlates the amounts of reflected red and/or NIR light with a corresponding crop volume value. Additionally, the controller 108 may be configured to generate a field map that visually identifies the crop volume value for the standing crop 12 in the field across each portion of the field traversed by the harvester 10.

In one embodiment, for example, the controller 108 may configured to estimate the crop volume value based one or more normalized difference vegetation index (NDVI) values determined for the quantity of the standing crops 12 shown in the images captured by the CIR camera 106. As is generally understood, the NDVI values may provide an indication of the health of crops based on the amounts of red and NIR light reflected by those crops. Specifically, the NDVI values may range between positive one and negative one, with the higher values (e.g., values close to positive one) being indicative of healthy crops and the lower values (e.g., values close to negative one) being indicative of unhealthy crops. For instance, the controller 108 may include a look-up table or suitable mathematical formula stored within its memory 112 that correlates the amounts of reflected red and NIR light to a corresponding NDVI.

Figure 4:
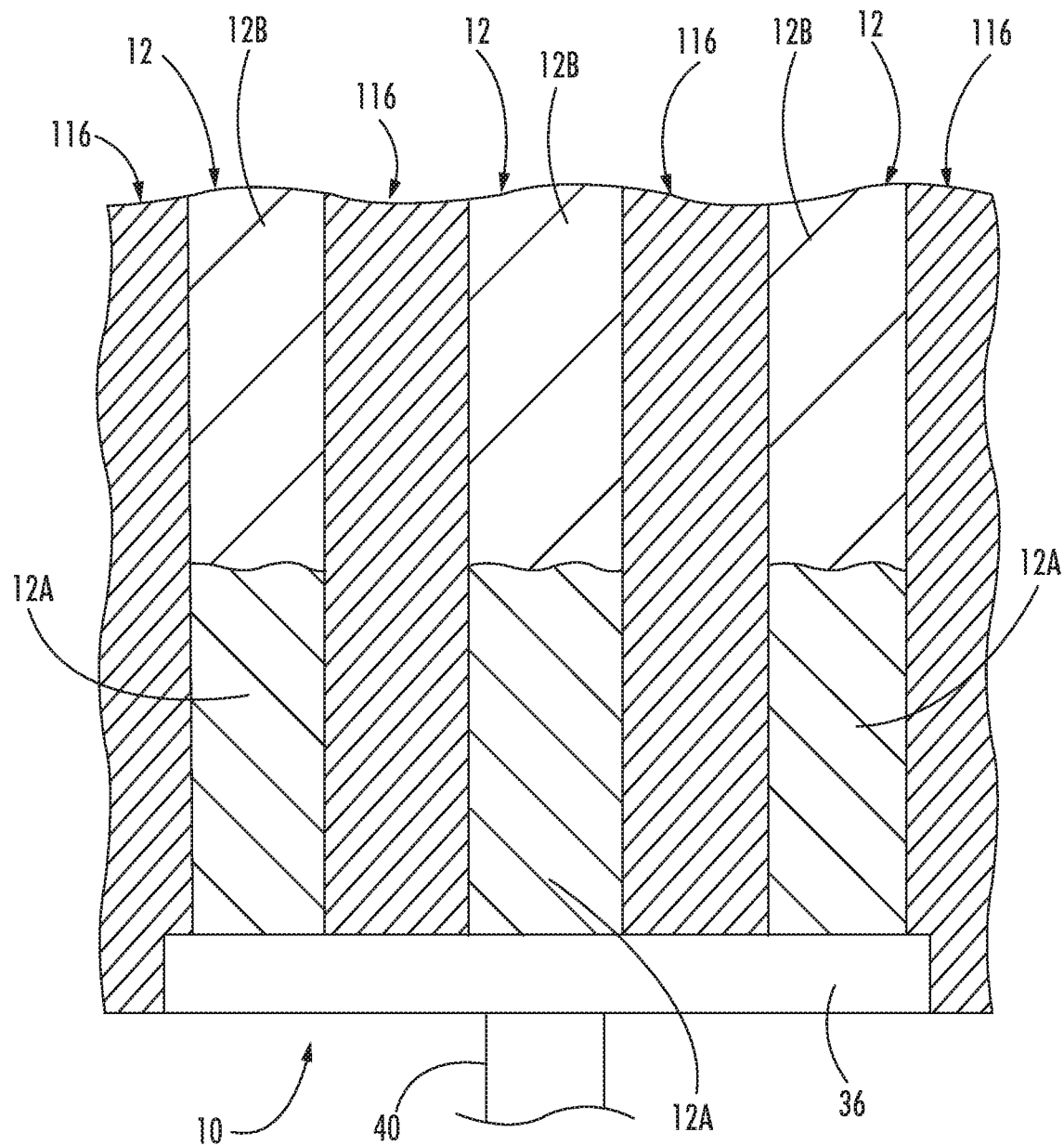
FIG. 4 illustrates an example aerial image of a standing crop to be harvested by an agricultural harvester in accordance with aspects of the present subject matter, particularly illustrating normalized difference vegetation index values of the standing crop.

Referring now to FIG. 4, an example aerial image of the NDVI values of the standing crop 12 located in front of the harvester 10 is illustrated in accordance with aspects of the present subject matter. As shown in FIG. 4, the NDVI values vary at different locations within the field. Specifically, areas 116 between the rows of the standing crop 12 may generally contain little to no crop materials 16. As such, the areas 116 may have low NDVI values, such as NDVI values proximate to negative one. In one embodiment, the areas 116 may be identified with a particular color, such as dark red, in the images received from the image capture device 102. The rows of the standing crop 12, however, may generally contain some appreciable amount of the crop materials 16. As mentioned above, the amount of crop materials 16 within the rows of the standing crop 12 may vary throughout the field. For instance, in the example aerial image of FIG. 4, it may be assumed that regions 12A of the rows of the standing crop 12 have a greater NDVI value than regions 12B of the rows of the standing crop 12. As such, the regions 12A, 12B may be depicted with different colors indicative of their varying NDVI values. For example, the regions 12A may be identified by dark green, while the regions 12B may be identified by light green. In this regard, it should be appreciated that the colors corresponding to the various NDVI values in the aerial image of FIG. 4 may be indicative of the estimated crop volume values of those particular quantities of standing crops 12. For example, in one embodiment, low crop volume values may be associated with red, moderate crop volume values may be associated with light green, and high crop volume values may be associated with dark green.

Referring back to FIG. 3, in several embodiments, the controller 108 may be configured to initiate a control action associated with adjusting one or more operating parameters of the harvester 10 based on a magnitude of the estimated crop volume value. More specifically, as mentioned above, the estimated crop volume value of the crop materials 16 to be ingested by and transferred through the harvester 10 may vary throughout the field. As such, in several embodiments, the controller 108 may be configured to adjust one or more operating harvester's parameters based on variations in the estimated crop volume value over time as the harvester 10 is moved through the field. For example, when the estimated crop volume value increases, the controller 108 may be configured to adjust one or more operating parameters in such a manner that permits the harvester 10 to intake and process the increased volume of crop materials 16. Conversely, when the estimated crop volume value decreases, the controller 108 may be configured to adjust one or more operating parameters in such a manner that permits the harvester 10 to intake and process the decreased volume of crop materials 16.

In several embodiments, the controller 108 may be configured to adjust one or more operating parameters associated with a speed of the harvester 10 relative to the field based on the estimated crop volume value. Specifically, as shown in FIG. 3, the controller 108 may be communicatively coupled to the transmission 39 of the harvester 10 via a wired or wireless connection to allow control signals (e.g., indicated by dashed lines 118 in FIG. 3) to be transmitted from the controller 108 to the transmission 39. Such control signals 118 may be configured to instruct the transmission to upshift or downshift so as to change the speed of the harvester 10. For example, when the estimated crop volume value increases, the control signals 118 may instruct the transmission 39 to downshift such that the speed of the harvester 10 is decreased. Conversely, when the estimated crop volume value decreases, the control signals 118 may instruct the transmission 39 to upshift such that the speed of the harvester 10 is increased. However, it should be appreciated that, in alternative embodiments, the controller 108 may be configured to transmit control signals 118 to any other suitable component of the harvester 10 such that the speed of the harvester 10 is adjusted.

Furthermore, the controller 108 may be configured to adjust one or more operating parameters associated with a power output of the harvester 10. Specifically, as shown in FIG. 3, the controller 108 may be communicatively coupled to the engine 38 of the harvester 10 via a wired or wireless connection to allow the control signals 118 to be transmitted from the controller 108 to the engine 38. Such control signals 118 may be configured to instruct the engine 38 to vary its power output so as to accommodate the increasing or decreasing volume of the crop materials 16. For example, when the estimated crop volume value increases, the control signals 118 may instruct the engine 38 to increase its power output (e.g., by increasing a fuel flow to the engine 38). Conversely, when the estimated crop volume value decreases, the control signals 118 may instruct the engine 38 to decrease its power output (e.g., by reducing the fuel flow to the engine 38). However, it should be appreciated that, in alternative embodiments, the controller 108 may be configured to transmit control signals 118 to any other suitable component of the harvester 10 such that the power output of the harvester 10 is adjusted.

Moreover, the controller 108 may be configured to adjust one or more operating parameters of the header 36 based on the estimated crop volume value. Specifically, as shown in FIG. 3, the controller 108 may be communicatively coupled to the header auger 50 (e.g., an actuator controlling the header auger 50) of the header 36 via a wired or wireless connection to allow the control signals 118 to be transmitted from the controller 108 to the header auger 50. Such control signals 118 may be configured to instruct the header auger 50 to vary its rotational speed so as to accommodate the volume of the crop materials 16 to be harvested by the header 36. For example, when the estimated crop volume value increases, the control signals 118 may instruct the header auger 50 to increase its rotational speed so as to deliver the harvested crop materials 16 to the feeder 40 at a faster rate. Conversely, when the estimated crop volume value decreases, the control signals 118 may instruct the header auger 50 to reduce its rotational speed so as to deliver the harvested crop materials 16 to the feeder 40 at a slower rate. However, it should be appreciated that, in alternative embodiments, the controller 108 may be configured to transmit control signals 118 to any other suitable component of the header 36 such that one or more operating parameters of the header 36 are adjusted so as to harvest estimated volume of crop materials 16.

The controller 108 may also be configured to adjust one or more operating parameters of the feeder 40 based on the estimated crop volume value. Specifically, as shown in FIG. 3, the controller 108 may be communicatively coupled to the feeder conveyor 52 (e.g., a motor or shaft controlling the operating speed of the feeder conveyor 52) of the feeder 40 via a wired or wireless connection to allow the control signals 118 to be transmitted from the controller 108 to the feeder conveyor 52. Such control signals 118 may be configured to instruct the feeder conveyor 52 to vary its speed so as to accommodate the volume of the crop materials 16 to be transferred through the feeder 40. For example, when the estimated crop volume value increases, the control signals 118 may instruct the feeder conveyor 52 to increase its speed so as to deliver the harvested crop materials 16 to the threshing and separating assembly 46 at a faster rate. Conversely, when the estimated crop volume value decreases, the control signals 118 may instruct the feeder conveyor 52 to reduce its speed so as to deliver the harvested crop materials 16 to the threshing and separating assembly 46 at a slower rate. However, it should be appreciated that, in alternative embodiments, the controller 108 may be configured to transmit control signals 118 to any other suitable component of the feeder 40 such that one or more operating parameters of the feeder 40 are adjusted so as to transfer estimated volume of crop materials 16 through the feeder 40.

Additionally, the controller 108 may also be configured to adjust one or more operating parameters of the threshing and separating assembly 46 based on the estimated crop volume value. Specifically, as shown in FIG. 3, the controller 108 may be communicatively coupled to the rotor 20 (e.g., an actuator controlling the rotor 20) of the threshing and separating assembly 46 via a wired or wireless connection to allow the control signals 118 to be transmitted from the controller 108 to the rotor 20. Such control signals 118 may be configured to instruct the rotor 20 to vary its speed so as to accommodate the volume of the crop materials 16 to be transferred through the threshing and separating assembly 46. For example, when the estimated crop volume value increases, the control signals 118 may instruct the rotor 20 to increase its speed so as to deliver the harvested crop materials 16 to the crop cleaning assembly 56 at a faster rate. Conversely, when the estimated crop volume value decreases, the control signals 118 may instruct the rotor 20 to reduce its speed so as to deliver the harvested crop materials 16 to the crop cleaning assembly 56 at a slower rate. However, it should be appreciated that, in alternative embodiments, the controller 108 may be configured to transmit control signals 118 to any other suitable component of the threshing and separating assembly 46 such that one or more operating parameters of the threshing and separating assembly 46 are adjusted so as to transfer estimated volume of crop materials 16 through the threshing and separating assembly 46.

Furthermore, the controller 108 may be configured to adjust one or more operating parameters of the crop cleaning assembly 56 based on the estimated crop volume value. Specifically, as shown in FIG. 3, the controller 108 may be communicatively coupled to the fan 62 (e.g., an actuator controlling the feeder conveyor 52) of the crop cleaning assembly 56 via a wired or wireless connection to allow the control signals 118 to be transmitted from the controller 108 to the fan 62. Such control signals 118 may be configured to instruct the fan 62 to vary its speed so as to accommodate the volume of the crop materials 16 to be transferred through the crop cleaning assembly 56. For example, when the estimated crop volume value increases, the control signals 118 may instruct the fan 62 to increase its speed so as to provide greater airflow to the sieves 60. Conversely, when the estimated crop volume value decreases, the control signals 118 may instruct the fan 62 to reduce its speed so as to provide reduced airflow to the sieves 60. However, it should be appreciated that, in alternative embodiments, the controller 108 may be configured to transmit control signals 118 to any other suitable component of the crop cleaning assembly 56 such that one or more operating parameters of the crop cleaning assembly 56 are adjusted so as to transfer estimated volume of crop materials 16 through the crop cleaning assembly 56.

In accordance with aspects of the present subject matter, the controller 108 may also be configured to adjust one or more operating parameters of the elevator 68 of the crop processing system 34 based on the estimated crop volume value. Specifically, as shown in FIG. 3, the controller 108 may be communicatively coupled to the elevator 68 (e.g., an actuator controlling the elevator 68) via a wired or wireless connection to allow the control signals 118 to be transmitted from the controller 108 to the elevator 68. Such control signals 118 may be configured to instruct the elevator 68 to vary its speed so as to accommodate the volume of the crop materials 16 to be transferred by the elevator 68. For example, when the estimated crop volume value increases, the control signals 118 may instruct the elevator 68 to increase its speed so as to deliver the harvested crop materials 16 to the crop tank 18 at a faster rate. Conversely, when the estimated crop volume value decreases, the control signals 118 may instruct the elevator 68 to reduce its speed so as to deliver the harvested crop materials 16 to the crop tank 18 at a slower rate.

Moreover, it should be appreciated that the controller 108 may be configured to adjust one or more operating parameters of any other suitable component of the crop processing system 34 based on the estimated crop volume value so as to transfer the estimated volume of the crop materials 16 from the header 36 to the crop tank 18. For example, in one embodiment, the controller 108 may be configured to adjust one or more operating parameters of the auger 66 based on the estimated crop volume value.

In several embodiments, the controller 108 may be configured to sequentially adjust the operating parameters of one or more components of the harvester 10 as the estimated crop volume value changes. More specifically, it may generally take a certain amount of time for a volume of crop materials to be transferred from the header 36 through the harvester 10 to the crop tank 18. As such, it may not be necessary to adjust the operating parameters of the downstream components of the harvester (e.g., the elevator 68) at the same time as the upstream components of the harvester (e.g., the header 36) since the downstream components will not receive the increased/decreased volume of the crop materials 16 until after the upstream components. In this regard, the controller 108 may be configured to adjust the operating parameters of one or more components of the harvester 10 based a time delay between when the crop volume value was initially harvested at the header 36 and when any downstream components will actually receive the previously harvested volume of the crop materials 16. For example, in one embodiment, the controller 108 may be configured to adjust the operating parameter(s) of the header auger 50 immediately when the controller 108 determines that the estimated crop volume value has changed based in the images received from the image capture device 102. After a first time period has elapsed since the change in the estimated crop volume value, the controller 108 may be configured to adjust the operating parameter(s) of the feeder conveyor 52. The controller 108 may also be configured to adjust the operating parameter(s) of the rotor 20 of the threshing and separating assembly 46 after a second time period has elapsed since the change in the estimated crop volume value, with the second time period being greater than the first time period. Thereafter, the controller 108 may be configured to adjust the operating parameter(s) of the fan 62 of the crop cleaning assembly 56 after a third time period has elapsed since the change in the estimated crop volume value, with the third time period being greater than the second time period. Furthermore, the controller 108 may be configured to adjust the operating parameter(s) of the elevator 68 after a fourth time period has elapsed since the change in the estimated crop volume value, with the fourth time period being greater than the third time period. However, it should be appreciated that, in alternative embodiments, the components of harvester 10 may be adjusted in any other suitable manner that allows the changed volume of the crop materials 16 to be transferred through the harvester 10.

Figure 5:
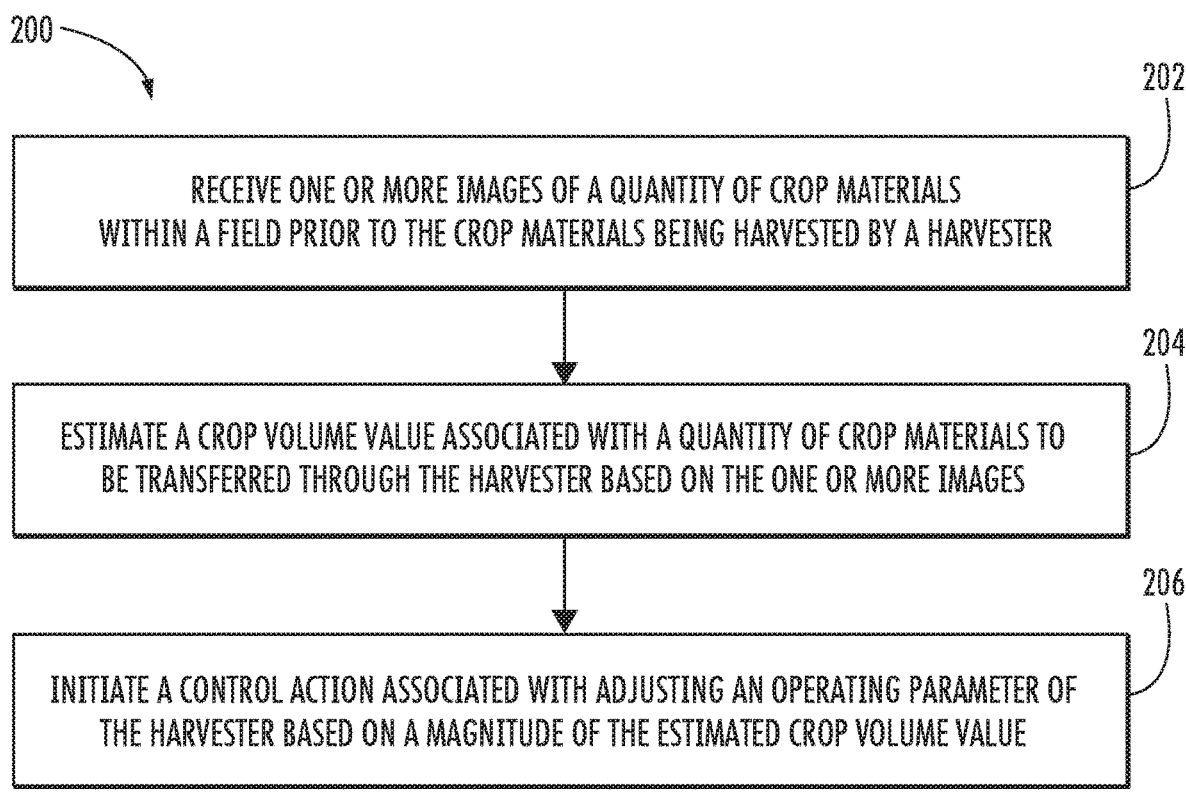
FIG. 5 illustrates a flow diagram of one embodiment of a method for adjusting operating parameters of an agricultural harvester based on estimated crop volume values in accordance with aspects of the present subject matter.

Referring now to FIG. 5, a flow diagram of one embodiment of a method 200 for adjusting operating parameters of an agricultural harvester based on estimated crop volume values is illustrated in accordance with aspects of the present subject matter. In general, the method 200 will be described herein with reference to the harvester 10 and the system 100 described above with reference to FIGS. 1-4. However, it should be appreciated by those of ordinary skill in the art that the disclosed method 200 may generally be utilized to adjust operating parameters of an agricultural harvester having any suitable harvester configuration and/or as part of a system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving, with a computing device, one or more images of a quantity of crop materials standing within a field prior to the crop materials being harvested by a harvester. For instance, as indicated above, the controller 108 may be communicatively coupled to the image capture device 102, which is configured to capture one or more images of the standing crop 12 located immediately in front of the header 36 of the harvester 10. As such, the controller 108 may be configured to receive the images of the standing crop 12 from the image capture device 102.

Additionally, at (204), the method 200 may include estimating, with the computing device, a crop volume value associated with a quantity of crop materials to be transferred through the harvester based on the one or more images. For instance, the controller 108 may be configured to estimate or determine a crop volume value associated with a quantity of the crop materials 16 to be ingested by and transferred through the harvester 10 as the harvester 10 is moved through the field based on the images captured by the image capture device 102.

Moreover, as shown in FIG. 5, at (206), the method 200 may include initiating, with the computing device, a control action associated with adjusting an operating parameter of the harvester based on a magnitude of the estimated crop volume value. As indicated above, the controller 108 may be configured to estimate a crop volume value for a quantity of the crop materials 16 to be ingested by the harvester 10 when the quantity of the standing crops 12 shown in the captured images is harvested by the harvester 10. In the event that the crop volume value changes, the controller 108 may then implement a control action to adjust an operating parameter of the harvester 10 so as to permit the changed volume of the crop materials 16 to be transferred through the harvester 10. As described above, such control actions may, in several embodiments, include controlling one or more components of the harvester 10. For instance, the controller 108 may, in one embodiment, be configured to control the engine 38 of the harvester 10 so as to increase or decrease a speed at which the harvester 10 is moved relative to the field. Furthermore, the controller 108 may be configured to adjust one or more operating parameters of the header 36 of the harvester 10, such as the rotational speed of the header auger 50. Additionally, the controller 108 may be configured to adjust one or more operating parameters of the crop processing system 34 of the harvester 10, such as the speed of the feeder conveyor 52, the rotational speed of the rotor 20 of the threshing and separating assembly 46, the speed of the fan 62 of the crop cleaning assembly 56, and/or the speed of the elevator 68.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for adjusting operating parameters of an agricultural harvester based on estimated crop volume values, the system comprising:
   an agricultural harvester including a harvesting implement configured to intake crop materials from a field and a crop processing system configured to process the crop materials received from the harvesting implement;
   an image capture device configured to capture one or more images of the crop materials standing within the field prior to the crop materials being harvested by the harvester; and
   a controller communicatively coupled to the image capture device, the controller being configured to:
      estimate a crop volume value associated with a quantity of the crop materials from the field to be transferred through the harvester based on the one or more images captured by the image capture device; and
      initiate a control action based on a magnitude of the estimated crop volume value associated with adjusting an operating parameter of one or more downstream components of the harvester that are downstream from the harvesting implement, wherein the control action is initiated based on a time delay associated with each downstream component, the time delay corresponding to a time between when the harvesting implement intakes the crop materials and when the crop materials are received by the corresponding downstream component, such that the operating parameter of the corresponding downstream component is not adjusted until the crop materials reaches that downstream component within the harvester.

2. The system of claim 1, wherein the image capture device is installed on the agricultural harvester.

3. The system of claim 1, wherein the image capture device is positioned on the agricultural harvester such that the image capture device has field of view directed toward a location immediately in front of the harvesting implement.

4. The system of claim 3, wherein the crop volume value corresponds to an instantaneous crop volume value estimated based on the one or more images captured by the image capture device of the crop materials standing within the field immediately in front of the harvesting implement.

5. The system of claim 4, wherein the image capture device is configured to continuously capture images of the crop materials located immediately in front of the harvesting implement as the agricultural harvester is moved through the field, the controller being configured to continuously update the estimated crop volume value based on the images received from the image capture device.

6. The system of claim 5, wherein the controller is configured to adjust the operating parameter based on variations in the crop volume value with time as the agricultural harvester is moved through the field.

7. The system of claim 1, wherein the control action is associated with adjusting a speed of the harvester relative to the field.

8. The system of claim 1, wherein the operating parameter corresponds to an operating speed of a header auger of the harvesting implement.

9. The system of claim 1, wherein the operating parameter includes an operating speed of at least one of a feeder conveyor of the crop processing system, a rotor of the crop processing system, or an elevator of the crop processing system.

10. The system of claim 1, wherein the image capture device corresponds to a color infrared camera.

11. A method for adjusting operating parameters of an agricultural harvester based on estimated crop volume values, the agricultural harvester including a harvesting implement configured to intake crop materials from a field and a crop processing system configured to process the crop materials received from the harvesting implement, the method comprising:

receiving, with a computing device, one or more images of a quantity of crop materials standing within the field prior to the crop materials being harvested by the harvester;

estimating, with the computing device, a crop volume value associated with a quantity of crop materials from the field to be transferred through the harvester based on the one or more images; and initiating, with the computing device, a control action based on a magnitude of the estimated crop volume value associated with adjusting an operating parameter one or more downstream components of the harvester that are downstream from the harvesting implement, wherein the control action is initiated based on a time delay associated with each downstream component, the time delay corresponding to a time between when the harvesting implement intakes the crop materials and when the crop materials are received by the corresponding downstream component, such that the operating parameter of the corresponding downstream component is not adjusted until the crop materials reaches that downstream component within the harvester.

12. The method of claim 11, wherein the image capture device is positioned on the agricultural harvester such that the image capture device has field of view directed toward a location immediately in front of the harvesting implement.

13. The method of claim 12, wherein the crop volume value corresponds to an instantaneous crop volume value estimated based on the one or more images of the crop materials standing within the field immediately in front of the harvesting implement.

14. The method of claim 13, further comprising:
continuously receiving, with the computing device, images of the crop materials located immediately in front of the harvesting implement as the agricultural harvester is moved through the field; and
continuously updating, with the computing device, the estimated crop volume value based on the received images.

15. The method of claim 14, further comprising:
adjusting, with the computing device, the operating parameter based on variations in the crop volume value with time as the agricultural harvester is moved through the field.

16. The method of claim 11, wherein the control action is associated with adjusting a speed of the harvester relative to the field.

17. The method of claim 11, wherein operating parameter corresponds to an operating parameter of at least one of the harvesting implement or the crop processing system.

18. A system for adjusting operating parameters of an agricultural harvester based on estimated crop volume values, the system comprising:
an agricultural harvester including a harvesting implement configured to intake crop materials from a field and a crop processing system configured to process the crop materials received from the harvesting implement, the crop processing system comprising a first component located downstream of the harvesting implement and a second component located downstream of the first component;
an image capture device configured to capture one or more images of the crop materials standing within the field prior to the crop materials being harvested by the harvester; and
a controller communicatively coupled to the image capture device, the controller being configured to:
estimate a crop volume value associated with a quantity of the crop materials from the field to be transferred through the harvester based on the one or more images captured by the image capture device; and
configured to initiate a control action associated with adjusting an operating parameter of the first component with a first time delay corresponding to a time between when the crop material is harvested and a time when the harvested crop materials reach the first component that is downstream of the harvesting implement, such that the operating parameter of the first component is not adjusted until the crop materials reaches the first component.

19. The system of claim 18, wherein the controller is further configured to initiate a control action associated with adjusting an operating parameter of the first component with a second time delay corresponding to a time between when the crop material is harvested and a time when the harvested crop materials reach the second component that is downstream of the harvesting implement, such that the operating parameter of the second component is not adjusted until the crop materials reaches the second component.

* * * * *